United States Patent

Kawamura et al.

[11] Patent Number: 4,774,566
[45] Date of Patent: Sep. 27, 1988

[54] COLOR IMAGE PROCESSING APPARATUS FOR PROCESSING A SERIAL COLOR SIGNAL COMPRISING PLURAL COLOR COMPONENT SIGNALS INTO IDENTICAL PHASE PARALLEL SIGNALS

[75] Inventors: Naoto Kawamura, Yokohama; Nobuo Matsuoka, Kawasaki, both of Japan

[73] Assignee: Canon Kabushiki Kaisha, Tokyo, Japan

[21] Appl. No.: 147,630

[22] Filed: Jan. 25, 1988

Related U.S. Application Data

[63] Continuation of Ser. No. 723,928, Apr. 16, 1985, abandoned.

[30] Foreign Application Priority Data

Apr. 27, 1984 [JP] Japan ................................. 59-86598

[51] Int. Cl.[4] .............................................. H04N 9/077
[52] U.S. Cl. .......................................... 358/75; 358/44
[58] Field of Search ......................... 358/41, 43, 44, 75

[56] References Cited

U.S. PATENT DOCUMENTS

| | | | |
|---|---|---|---|
| 4,496,967 | 1/1985 | Sase et al. | 358/44 |
| 4,580,160 | 4/1986 | Ochi et al. | 358/44 |
| 4,641,183 | 2/1987 | Kinoshita | 358/44 |
| 4,654,698 | 3/1987 | Langworthy | 358/41 |

Primary Examiner—James J. Groody
Assistant Examiner—Robert M. Bauer
Attorney, Agent, or Firm—Fitzpatrick, Cella, Harper & Scinto

[57] ABSTRACT

A color image processing apparatus has a CCD shift register for reading a color image in accordance with reference clock pulses, a pre-sample-hold circuit for performing color separation of serial color signals and producing parallel color signal in accordance with sample clock pulses, post-sample-hold circuits, and a matrix circuit for correcting the color signals. The CCD shift register, the pre-sample-hold circuit and the post-sample-hold circuits can be integrated as a line sensor. Serial color signals can be processed at high speed and at low cost.

11 Claims, 5 Drawing Sheets

COLOR IMAGE PROCESSING APPARATUS FOR PROCESSING A SERIAL COLOR SIGNAL COMPRISING PLURAL COLOR COMPONENT SIGNALS INTO IDENTICAL PHASE PARALLEL SIGNALS

This application is a continuation-in-part continuation, of application Ser. No. 723,928 filed 4/16/85, now abandoned.

BACKGROUND OF THE INVENTION

1. Field of the Invention

The present invention relates to a color image processing apparatus for processing a color image signal in a color copying machine or the like.

2. Description of the Prior Art

Figure 1:
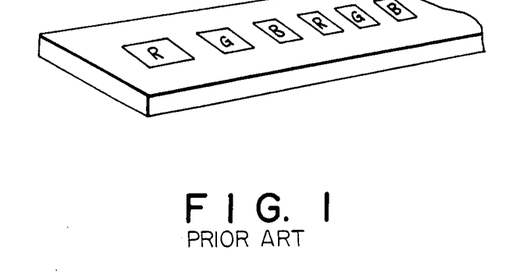
FIG. 1 is a perspective view of a conventional line sensor.

Conventional color original reading using a line sensor such as a CCD has been proposed. As shown in FIG. 1, color separation filters (e.g., red R, green G and blue B) are sequentially formed by vacuum deposition or the like on the corresponding light-receiving elements of a one-dimensional sensor. An original image is color-separated by the one-dimensional sensor to read the original image. This conventional system is receiving a great deal of attention due to the following advantages and will be used in a variety of applications:

(1) A special tricolor separation optical system is not required and the apparatus as a whole can be made compact.

(2) The optical system or the like can be easily adjusted and color misregistration is prevented.

However, since such a one-dimension sensor generates serial tricolor image data, a high-speed driver is required to read the original image with a high resolution. In addition, in order to obtain accurate image data, a required peripheral circuit arrangement results in high cost and a large size.

Figure 2:
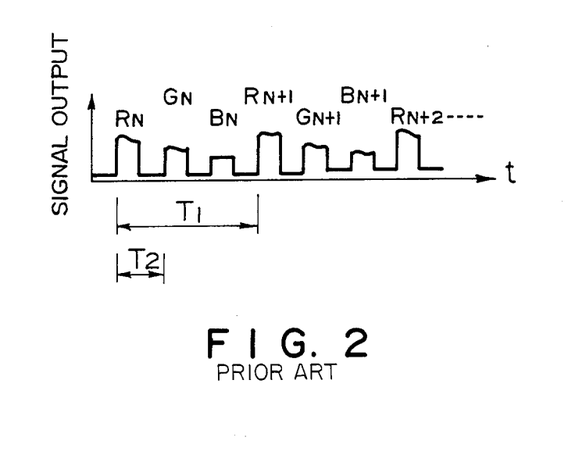
FIGS. 2 and 3 are respectively timing charts of output signals from the line sensor shown in FIG. 2.

FIG. 2 is a timing chart showing an output signal from the one-dimensional sensor. The signals charged by the R, G and B filters of the line sensor shown in FIG. 1 in accordance with the light intensities of the incident light components are voltage-converted to color signal pulses $R_N$, $G_N$, $B_N$, $R_{N+1}$, $G_{N+1}$, $B_{N+1}$, $R_{N+2}$, ... which are serially generated. Assume that a set of pulses $R_N$, $G_N$ and $B_N$ of FIG. 2 constitutes a color image signal for one pixel, and that a time $T_1$ is required to generate this color image signal. At time $T_2$ for generating one color signal pulse $R_N$, $G_N$ or $B_N$ is illustrated in FIG. 2 as follows:

$$T_2 = T_1/3$$

Figure 3:
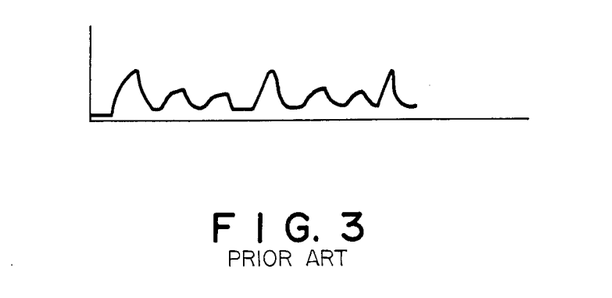

In a high-speed, high-resolution apparatus, the read time is extremely short. For this reason, an external amplifier circuit for receiving the high-speed pulses must have good high-frequency characteristics, so that the circuit arrangement is complicated and costly. However, when a simple circuit arrangement is used in place of a complex high-speed amplifier circuit, only a distorted output, as shown in FIG. 3, is obtained.

Even if an external circuit having good high-frequency characteristics is used, the pulses from the sensor are subject to disturbance along the signal lines up to the external amplifier circuit. As a result, only the distorted waveform shown in FIG. 3 is obtained.

Serial high-speed pulses suitable for electrically performing masking and undercolor removal so as to produce optimal image signals cannot be realized by using the tricolor signal obtained as described above.

SUMMARY OF THE INVENTION

The present invention has been made in consideration of the above situation, and has as its object to provide a color image processing apparatus for accurately and easily processing a color image signal.

It is another object of the present invention to provide a color image processing apparatus for properly processing a plurality of serial color pulses representing color components of each pixel of the color image.

It is still another object of the present invention to provide a color image processing apparatus suitable for high-resolution color image reading.

It is still another object of the present invention to provide a color image processing apparatus for processing high-speed color pulses at a low speed.

The above and other objects, features and advantages of the present invention will become apparent from the following detailed description taken in conjunction with the accompanying drawings.

DETAILED DESCRIPTION OF THE PREFERRED EMBODIMENT

The present invention will be described in detail with reference to the accompanying drawings.

Figure 4:
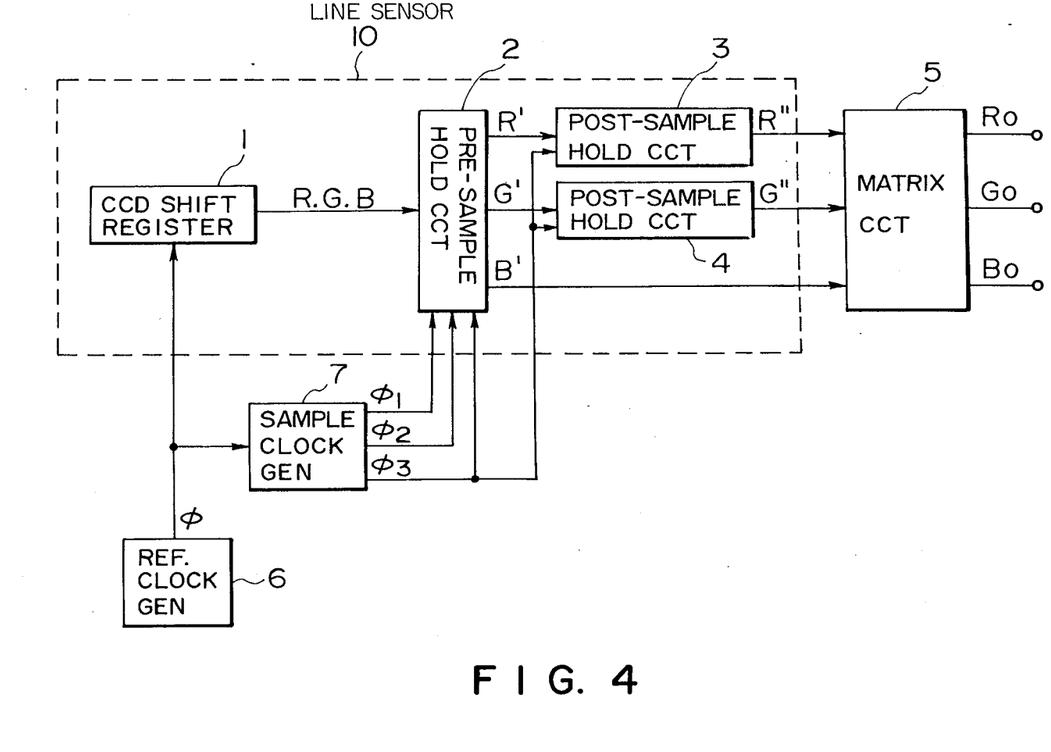
FIG. 4 is a block diagram of a color image processing apparatus according to an embodiment of the present invention.
Figure 5:
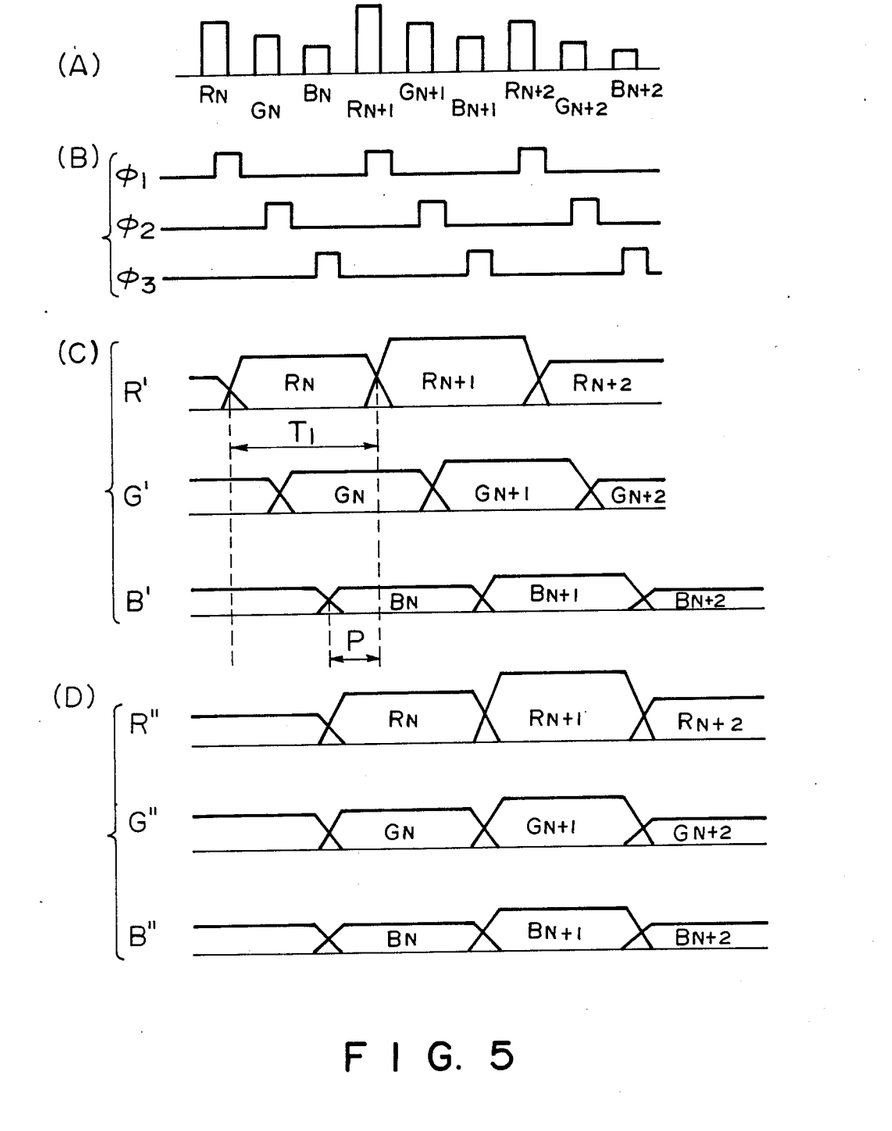
FIGS. 5A to 5D are respectively timing charts for explaining the operation of the apparatus shown in FIG. 4.

FIG. 4 is a block diagram of a color image processing apparatus according to an embodiment of the present invention. A CCD shift register 1 has a plurality of light-receiving elements constituting a tricolor (R, G and B) filter unit. The CCD shift register 1 converts charges corresponding to the intensities of incident light components into voltage signals. The CCD shift register 1 generates serial tricolor pulses R, G and B in response to reference clocks $\phi$ generated from a reference clock generator 6, as shown in FIG. 2. A pre-sample hold circuit 2 is connected to a sample clock generator 7 to receive clock $\phi_1$, $\phi_2$ and $\phi_3$ therefrom. The pre-sample hold circuit 2 also receives the serial tricolor pulses from the CCD shift register 1 and then generates parallel tricolor pulses R', G' and B' in response to the sample clock $\phi_1$, $\phi_2$ and $\phi_3$, respectively. In this manner, the pre-sample hold circuit 2 performs sample hold operation at the leading edges of the respective sample clocks. A post-sample hold circuit 3 receives and sample-holds the color clock R' at the leading edge of the sample clock $\phi_3$. Similarly, a post-sample hold circuit 4 receives and sample-holds the color clock G' at the leading edge of the sample clock $\phi_3$. The CCD shift register 1, the pre-sample hold circuit 2 and the post-sample hold circuits 3 and 4 are preferably formed on a single chip so as to constitute the line sensor 10.

A matrix circuit 5 receives the three color component pulses R", G" and B" generated from the line sensor 10 and performs matrix operation as follows:

$$\begin{pmatrix} R_0 \\ G_0 \\ B_0 \end{pmatrix} = \begin{pmatrix} a_{00} & a_{01} & a_{02} \\ a_{10} & a_{11} & a_{12} \\ a_{20} & a_{21} & a_{22} \end{pmatrix} \begin{pmatrix} R'' \\ G'' \\ B'' \end{pmatrix}$$

In this manner, the matrix circuit 5 performs a correction operation with reference to the color properties of the color filters and the light-receiving elements. Color pulses $R_0$, $G_0$ and $B_0$ generated from the matrix circuit 5 are subjected to processing, such as undercolor removal, as needed. The processed pulses are supplied to a device such as a color printer, a color facsimile transmitter, or a memory such as an optical disk.

Figure 6:
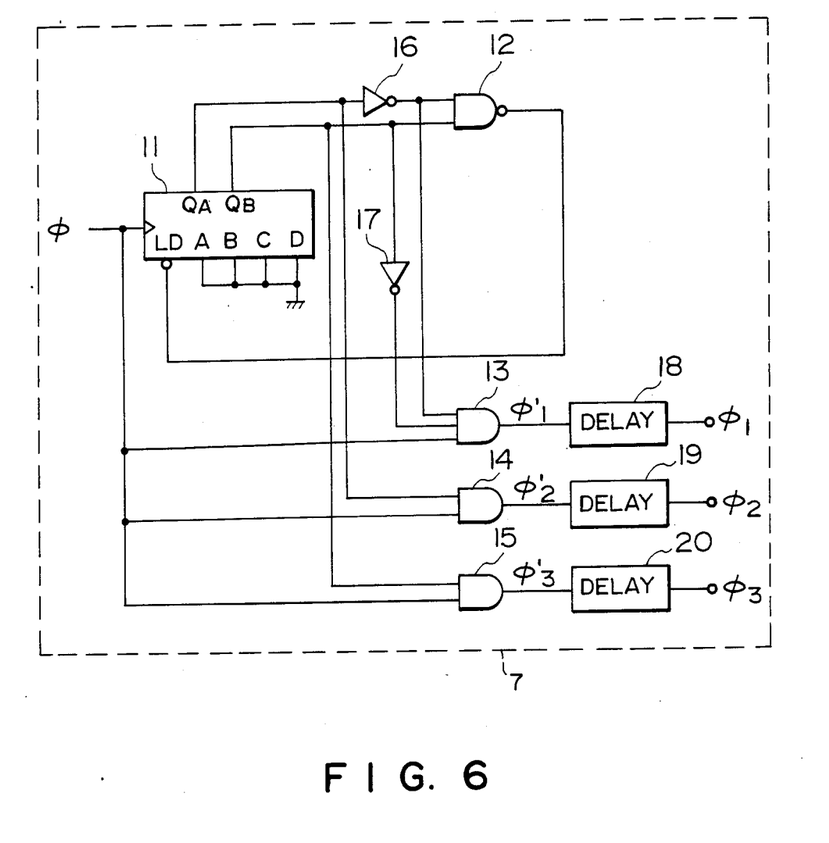
FIG. 6 is a circuit diagram of a sample clock generator shown in FIG. 5.
Figure 7:
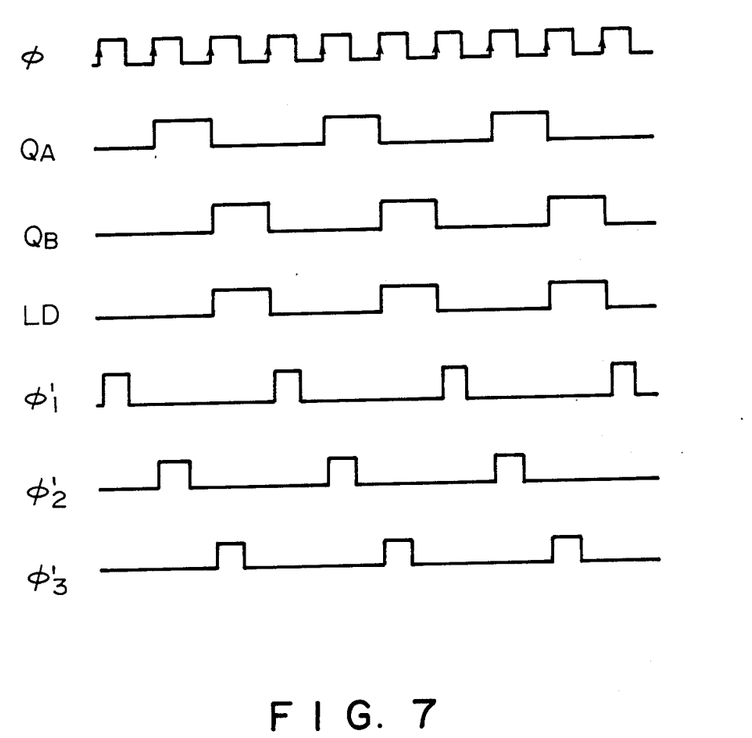
FIG. 7 is a timing chart for explaining the operation of the sample clock generator of FIG. 6.

FIG. 6 is a detailed circuit diagram of the sample clock generator 7 shown in FIG. 7, and FIG. 7 shows the operation thereof. A ternary counter 11 comprises an IC SN74LS191 or the like. An output of a NAND gate 12 is connected to a load terminal LD of the ternary counter 11. The inputs of the NAND gate 12 are connected to an output QB of the counter 11 and an output QA thereof through an inverter 16. AND gates 13 to 15 commonly receive the clock pulse $\phi$ at their first inputs. The second and third inputs of the AND gate 13 are connected to the output QB through an inverter 17 and the output of the inverter 16, respectively. The second input of the AND gate 14 is connected to the output QA. The second input of the AND gate 15 is connected to the output QB. The outputs of the AND gates 13 and 15 are connected to inputs of delay circuits 18 to 20, respectively. It should be noted that inputs A, B, C and D of the counter 11 are commonly grounded.

As shown in FIG. 7, the counter 11 receives the reference clock $\phi$ from the reference clock generator 6 and performs counting by counter outputs QA and QB. The load terminal LD receives an output from the NAND gate 12 which receives the output QB and an inverted signal of the output QA. When the output QA is set at low level and the output QB is set at high level, the counter 11 is set in the load state in response to an output from the NAND gate 12. Since the counter 11 comprises a synchronous counter, the initial value, i.e., "0" is loaded at the leading edge of the next clock $\phi$.

The AND gates 13 to 15 selectively receive the outputs QA and QB from the counter 11 and commonly receive the reference clock $\phi$, as shown in FIG. 6. As a result, the AND gates 13 to 15 generate clocks $\phi1'$, $\phi2'$ and $\phi3'$. These clocks are supplied to the delay circuits 18 to 20 and delayed by predetermined times, respectively. The delay circuits 18 to 20 generate sample clocks $\phi1$ to $\phi3$ which are phase-shifted by 120° from each other.

FIGS. 5A to 5D are timing charts for explaining the sample hold operation of the circuit shown in FIG. 4.

FIG. 5A shows serial output pulses generated from the CCD shift register 1. Suffixes N, N+1, ... of letters R, G and B represent pixel numbers. For example, the color pulses $R_N$, $G_N$ and $B_N$ correspond to the Nth pixel. The tricolor pulses $R_N$, $G_N$ and $B_N$ for one pixel are serially generated in units of pixels in response to the reference clock $\phi$. FIG. 5B shows the sample clocks $\phi1$ to $\phi3$ generated from the sample clock circuit 7. The sample clock pulses $\phi1$ to $\phi3$ are phase-shifted by 120° from each other. The sample-hold color pulses R', G' and B' in the pre-sample hold circuit 2 in response to the sample clocks $\phi1$ to $\phi3$ are shown in FIG. 5C. Each color pulse has a frequency $\frac{1}{3}$ of the corresponding pulse in FIG. 5A.

The serial color pulses are separated in units of color components and their frequency can also be decreased. In this case, the respective color component pulses are still phase-shifted by 120° from each other. Therefore, when the matrix operation described above is performed in this state, the time P for simultaneously generating tricolor component pulses is $T_1/3$. Thus, in the same manner as in the conventional apparatus, high-speed matrix operation is required.

The outputs R' and G' among the outputs R', G' and B' from the sample hold circuit 2 are supplied to the sample hold circuits 3 and 4, respectively. As described above, the sample clock $\phi3$ is supplied as a timing pulse from the sample clock generator 7 to the post-sample hold circuits 3 and 4 which respectively sample-hold the input signals R' and G' at the leading edge of the common sample hold clock, thereby obtaining the outputs shown in FIG. 5D. The tricolor pulses are separated from the respective color components pulses R", G" and B" whose frequency is decreased. Therefore, the matrix operation in the matrix circuit 5 can be performed during an output cycle (i.e., $T_1$) for one pixel, and thus high-speed operation is not required.

In the above embodiment, the line sensor is used. However, the light-receiving elements can be arranged as a two-dimensional sensor i.e., a planar sensor to obtain the same effect as in the above embodiment. The R, G and B color signals are used, however, other color signals may be used. In addition, the number of colors is not limited to three.

The delay operation of the shift register can be used as sample-hold operation of the post-sample hold circuits. The present invention can also be applied to a color signal supplied through a transmission line from a color facsimile system in addition to the color signal from the original reader.

As is apparent from the above description, high-speed serial image pulses can be converted to parallel pulses, so that a following processing circuit need not comprise a high-speed arrangement, thus resulting in low cost and proper image signal processing.

What we claim is:
1. A color image processing apparatus comprising:
   input means for supplying a serial color signal comprising plural serial color component signals representing each pixel of a color image;
   means for separating the plural serial color component signals supplied from said input means, said separating means including a pre-sampling circuit which samples each of the serial color component signals in response to each of a plurality of sampling signals, and each sampling signal respectively being synchronized with each color component signal; and
   means for converting the color component signals which have been separated by said separating means into parallel color component signals having an identical phase, said converting means including a post-sampling circuit which again samples the color component signals in response to a predetermined sampling signal.

2. An apparatus according to claim 1, wherein said input means has a reading means for color-filtering and reading the color image.

3. An apparatus according to claim 1, wherein said separating means separates the plural serial color component signals supplied by said input means at predetermined phase differences.

4. An apparatus according to claim 1, further comprising means for processing the color image on the basis of the parallel color component signals converted by said converting means.

5. An apparatus according to claim 1, wherein said input means supplies the serial color signal at a first frequency, and said converting means generates the parallel color component signals at a second frequency lower than the first frequency.

6. An apparatus according to claim 1, wherein one of the sampling signals to which said pre-sampling circuit is responsive is used as the predetermined sampling signal in said post-sampling circuit.

7. An apparatus according to claim 6, wherein said post-sampling circuit is provided for the color component signal corresponding to each of the plural sampling signals in said pre-sampling circuit except for the sampling signal used as the predetermined sampling signal in said post-sampling circuit.

8. An apparatus according to claim 1, wherein said pre-sampling circuit and said post-sampling circuit respectively include sample-and-hold circuits, said sample-and-hold circuits holding analog signals.

9. A color image processing apparatus comprising:

sensor means having a plurality of color filter components periodically aligned therein to color-filter and read a color image;

means for conducting a serial color signal comprising plural serial color component signals corresponding to said plurality of color filter components from said sensor means;

means for separating the plural serial color component signals conducted from said sensor means into units of color components, said separating means including a sample-and-hold circuit which samples and holds the serial color component signals in response to a plurality of signals of respectively different phases, the different-phase signals being synchronized with a drive signal for driving said sensor means;

means for converting the separated color signals having different phases and obtained by said separating means into parallel color component signals having an identical phase; and means for processing the color image on the basis of the parallel color component signals converted by said converting means.

10. An apparatus according to claim 9, wherein said sensor means generates the serial color signal composing the plural color component signals representing color components of each pixel of the color image.

11. An apparatus according to claim 9, wherein said sensor means generates the serial color signal at a first frequency, and said converting means generates the parallel color component signals at a second frequency lower than the first frequency.

* * * * *

UNITED STATES PATENT AND TRADEMARK OFFICE
CERTIFICATE OF CORRECTION

PATENT NO. : 4,774,566

DATED : September 27, 1988

INVENTOR(S) : NAOTO KAWAMURA, ET AL.

It is certified that error appears in the above-identified patent and that said Letters Patent is hereby corrected as shown below:

AT [57] IN THE ABSTRACT

Line 5, "signal" should read --signals--.

COLUMN 1

Line 8, "continuation-in-part" should be deleted.
    Line 33, "one-dimension" should read --one-dimensional--.

COLUMN 2

Line 28, "FIG. 2;" should read --FIG. 1;--.
    Line 36, "FIG. 5;" should read --FIG. 4;--.

COLUMN 3

Line 21, "FIG. 7," should read --FIG. 4,--.
    Line 35, "13 and 15" should read --13 to 15--.
    Line 39, "FIG. 7," should read --FIG. 6,--.
    Line 68, "sample clock circuit 7." should read --sample clock generator 7.--.

UNITED STATES PATENT AND TRADEMARK OFFICE
CERTIFICATE OF CORRECTION

PATENT NO. : 4,774,566        Page 2 of 2

DATED : September 27, 1988

INVENTOR(S) : NAOTO KAWAMURA, ET AL.

It is certified that error appears in the above-identified patent and that said Letters Patent is hereby corrected as shown below:

COLUMN 4

Line 25, "from" should read --into--.
    Line 25, "components" should read --component--.
    Line 30, "used" should read --used.--.

Signed and Sealed this

Eleventh Day of April, 1989

Attest:

DONALD J. QUIGG

*Attesting Officer*      *Commissioner of Patents and Trademarks*